(12) United States Patent
Fuchs et al.

(10) Patent No.: US 6,342,832 B1
(45) Date of Patent: Jan. 29, 2002

(54) PREVENTING THE COLLISION OF A VEHICLE WITH AN OBSTACLE

(75) Inventors: Alexander Fuchs, Esslingen; Wolfgang Kiesewetter, Waiblingen; Bernd Knoff, Esslingen; Carsten Lauer, Stuttgart; Lorenz Maack, Böblingen; Eberhard Pfeifle, Lorch; Manfred Steiner, Winnenden, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/529,441
(22) PCT Filed: Sep. 29, 1998
(86) PCT No.: PCT/EP98/06163
§ 371 Date: Jun. 22, 2000
§ 102(e) Date: Jun. 22, 2000
(87) PCT Pub. No.: WO99/19194
PCT Pub. Date: Apr. 22, 1999

(30) Foreign Application Priority Data

Oct. 13, 1997 (DE) .......................... 197 45 127

(51) Int. Cl.[7] ................................ B60Q 1/00
(52) U.S. Cl. .................. 340/436; 340/903; 701/93; 180/169; 180/170
(58) Field of Search ................ 340/426, 436, 340/903, 901, 435, 451, 452, 453; 180/167, 169, 170; 701/3, 1, 97, 93, 95; 280/435, 88, 734, 761

(56) References Cited

U.S. PATENT DOCUMENTS

| 4,893,691 A | | 1/1990 | Park | |
|---|---|---|---|---|
| 5,410,484 A | * | 4/1995 | Kunimi | 180/170 |
| 5,574,644 A | * | 11/1996 | Butsuen | 340/903 |
| 5,864,285 A | * | 1/1999 | Wieder | 340/435 |
| 6,006,144 A | * | 12/1999 | Takahashi | 701/1 |
| 6,178,372 B1 | * | 1/2001 | Tabata | 701/97 |

FOREIGN PATENT DOCUMENTS

| DE | 36 42 874 C2 | 4/1989 |
|---|---|---|
| DE | 41 01 759 A1 | 8/1991 |
| DE | 42 18 484 A1 | 12/1992 |
| DE | 43 10 354 A1 | 10/1993 |
| DE | 43 12 595 A1 | 3/1994 |

* cited by examiner

*Primary Examiner*—Jeffery Hofsass
*Assistant Examiner*—Anh La
(74) *Attorney, Agent, or Firm*—Crowell & Moring, LLP

(57) ABSTRACT

A process and device are disclosed for preventing a vehicle from colliding with an obstacle during parking. The object of the invention is therefore to ensure that a collision can be reliably avoided without any additional intervention of the drive. In a device with at least one sensor for generating signals which represent the distance between the vehicle and an obstacle, the signals are processed in an evaluation unit. When at least one distance-representing signal falls below a limit value, a warning signal is generated. This warning signal drives a control valve which generates a pressure difference between the working chamber and the vacuum chamber in a brake booster when the warning signal is generated. This pressure difference causes the braking pressure to rise in the wheel brake cylinder and therefore slows the vehicle down to a standstill.

20 Claims, 2 Drawing Sheets

PREVENTING THE COLLISION OF A VEHICLE WITH AN OBSTACLE

The invention relates to a device and a method for preventing collisions between a vehicle and an obstacle when parking.

It is known to arrange one or more sensors in vehicles which detect the distance between the vehicle and an obstacle. If the distance from an obstacle drops below a limiting value, it is known to generate a signal, as a result of which a visual and/or audible indication is issued.

A disadvantage with this procedure is that it does not prevent the collision occurring. This is the case only if the driver reacts appropriately.

The object of the invention is therefore to ensure that a collision is reliably prevented without further intervention by the driver.

This object is achieved by means of the device according to the invention and by means of the method according to the invention, in accordance with the independent patent claims. Further advantageous refinements are contained in the subclaims.

In a device having at least one sensor for generating signals which represent the distance between the vehicle and an obstacle, these signals are processed in an evaluation unit. If at least one distance signal drops below a limiting value, an alarm signal is generated. By means of this alarm signal a control valve is actuated which generates a pressure difference between the working chamber and the partial vacuum chamber in a brake booster when the alarm signal is present. this pressure difference leads to a build-up of brake pressure in the wheel brake cylinders and thus causes the vehicle to decelerate to a standstill.

According to one advantageous development, when an alarm signal is not present the control valve serves as a conventional proportional valve which generates a pressure difference between the partial vacuum chamber and the working chamber of the brake booster which is proportional to the activation force of the brake pedal.

In accordance with the method according to the invention, the distance from an obstacle is sensed by means of at least one sensor in order to prevent collisions when parking the vehicle. If at least one distance signal drops below a limiting value, a brake pressure which causes the vehicle to come to a standstill is generated in wheel brakes.

According to one advantageous refinement, the brake pressure is maintained here until it is detected that the vehicle has come to a standstill. Further refinements present further switching-off criteria which must be present in addition to the vehicle being at a standstill so that the brake pressure is reduced. These are the switching of the gear lever, the activation of the clutch and the activation of the accelerator pedal by the driver. According to further subclaims, the brake pressure is progressively increased until the vehicle comes to a standstill. In order to reliably keep the vehicle at a standstill, according to a further refinement the brake pressure is increased further, but a specific amount is predefined for this increase.

According to an advantageous refinement which goes further, the collision monitoring is maintained for the period of the braking operation, and if the monitoring system detects the end of a risk of collision or a driver intervention to avert the collision (for example by means of a steering angle sensor), the automatic braking intervention can be aborted prematurely.

The invention is explained in more detail below with reference to the examples illustrated in the drawing, in which.

Figures 1, 1A:
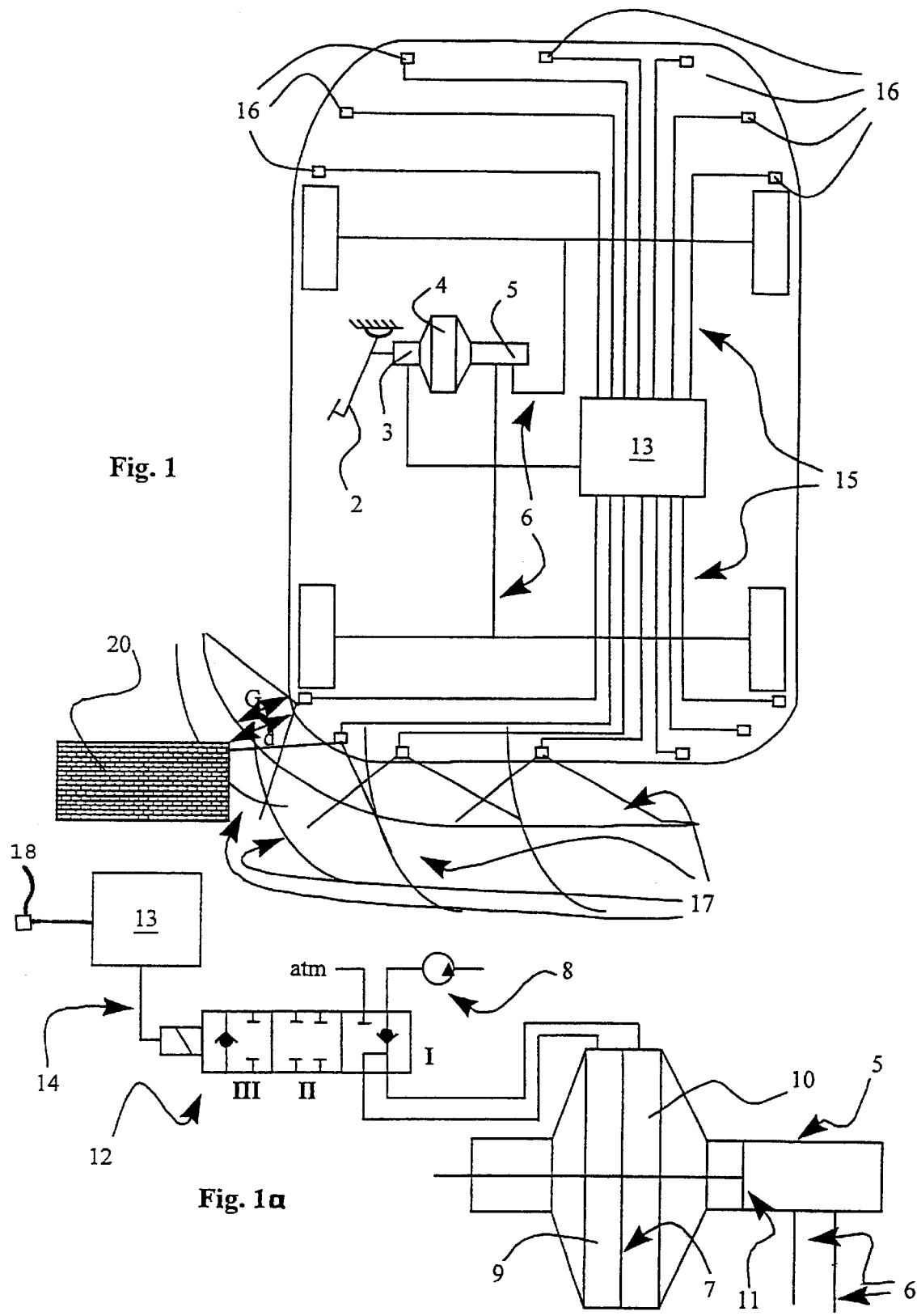
FIG. 1 shows a schematic example of a device for preventing collisions which is also suitable for implementing a method according to the invention.
FIG. 1a shows a schematic functional illustration of the control valve.

FIG. 1 shows a schematic view of a vehicle 1 with a brake pedal 2 which is connected through the control housing 3 to the diaphragm 7 of the brake booster 4. The diaphragm separates the working chamber 9 from the partial vacuum chamber 10. The piston 11 of the master brake cylinder 5 from which brake lines 6 lead to the wheel brakes is also connected to the diaphragm. The control valve 12 which is arranged in the control housing 3 and which can both be activated electrically and switched in the usual way as a proportional valve as a function of the activation force of the brake pedal is connected to the evaluation unit 13 via the control line 14. The lines 15 which transmit the distance signals of the sensor 16 lead to the evaluation unit 13. The sensors 16 are arranged here on the vehicle in such a way that their monitored areas 17 which are represented only partially extend over all the areas of the bodywork of the vehicle which are at risk of being affected by collisions. The sensors 16 used are usually ultrasonic sensors, but the implementation of the invention is independent of the type of distance sensors used.

FIG. 1a shows the method of operation of the device. For this purpose, the control valve 12 is represented outside the control housing so that its switched positions can be shown. The control valve 12 is actuated by the evaluation unit 13 via the control line 14. In its unactivated position of rest I, the partial vacuum source 8 is connected both to the partial vacuum chamber 10 and to the working chamber 9. Both chambers are ventilated (for the case of the partial vacuum brake booster illustrated here). In order to ventilate the working chamber, the control valve 12 is moved into the position III in which the working chamber 9 is connected to the atmosphere. If the working chamber 9 is connected to the atmosphere directly and without throttling, a large brake pressure is built up as quickly as possible. The vehicle is quickly brought to a standstill. In the intermediate position II of the control valve, both the working chamber 9 and the partial vacuum chamber 10 are shut off. This position is suitable for maintaining an applied pressure difference between the chambers 9, 10 of the brake booster 4, and thus generating a constant brake pressure.

Figure 2:
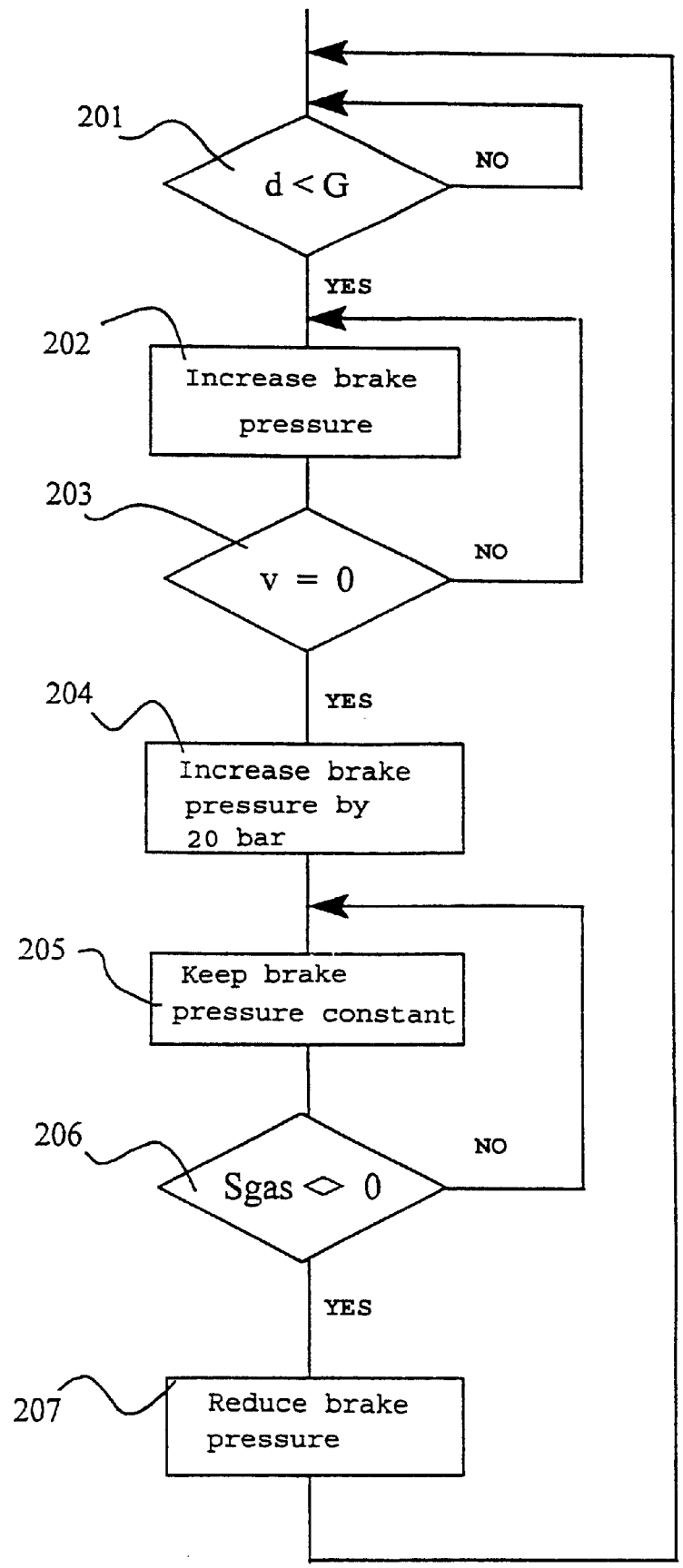
FIG. 2 shows a schematic flowchart of a method for preventing collisions.

FIG. 2 shows the flowchart of a method according to the invention which is suitable for being implemented on a device according to the invention. According to step 201, a check is made as to whether the distance d from an obstacle is smaller than the limiting value G. This step is repeated until it is detected that the distance d is smaller than the limiting value G. The limiting value G is preferably determined here as a function of the velocity of the vehicle, it being possible to use the principle that the stopping distance is proportional to the square of the velocity of the vehicle. A value of G which becomes greater in absolute terms is therefore determined as the velocity of the vehicle increases. Then, according to step 202, a brake pressure is built up. Here, either a claimed device for preventing collisions or a different power-assisted brake system, for example a brake system with electrical activation of the brakes or a brake system with hydraulic power assistance, can be used to build up the brake pressure. According to one advantageous refinement, the gradient of the brake pressure, that is to say the speed of increase of the brake pressure, is determined as a function of the distance (d) from the obstacle and/or the velocity (v) of the vehicle. In step 203, it is then checked whether the velocity v of the vehicle is equal to zero, that is to say whether the vehicle has been brought to a standstill. If this is not the case, the system jumps back to step 202. Otherwise, according to step 204, the brake pressure is increased further by a predefined amount, for example by 20 bar. The brake pressure is then kept constant according to step 205, and subsequently in step 206 it is checked whether the accelerator pedal is activated. However, a precondition for this is that the accelerator pedal has previously already reached the unactivated idling position. If the pedal continues to be in the idling position, the system jumps back to step 205. On the other hand, if the accelerator pedal is activated, according to step 207, the brake pressure is reduced. After the reduction of the brake pressure, the renewed active reduction of brake pressure is prevented for a specific time or until a specific velocity of the vehicle (for example 5 km/h) is exceeded. The system then jumps to step 201.

When the vehicle starts, the active build-up of brake pressure may take place only if either a switch 18 which is provided for this purpose is activated or if an obstacle is detected which is a smaller distance (d) away than a limiting value G. If, after the vehicle starts, an active build-up of brake pressure takes place in order to prevent the vehicle colliding with an obstacle 20, this active build-up of brake pressure can also be terminated by activating a switch which is provided for this, in particular the switch which also permits the automatic braking procedure to be initiated. These measures serve to permit the vehicle driving away or rolling away after it has started.

What is claimed is:

1. Method for preventing collisions between a vehicle and an obstacle when parking the vehicle, the vehicle having at least one sensor for generating distance signals, the distance signals representing the distance of the vehicle from an obstacle, comprising:

detecting, in an evaluation unit, when at least one distance signal drops below a limiting value, and generating a brake pressure which causes the vehicle to come to a standstill in wheel brakes, wherein both the brake pressure and its gradient are determined as a function of said distance, of a velocity of the vehicle, or of both said distance and said velocity.

2. Method according to claim 1, wherein, after the vehicle has come to a standstill, the brake pressure is further increased by a predefined amount and is subsequently kept constant.

3. Method according to claim 1 wherein the limiting value is determined as a function of the velocity of the vehicle.

4. Method according to claim 1, wherein, after reducing the brake pressure, the brake pressure is increased and then kept constant until an accelerator pedal is activated.

5. Method according to claim 1, wherein, after the vehicle is started, an active build-up of brake pressure is deactivated until a switch is activated by the driver.

6. Method according to claim 4, wherein a build-up of brake pressure which can be activated by the switch can be deactivated by the switch.

7. Method according to claim 4, and further comprising terminating the active build-up of brake pressure by the switch.

8. Method according to claim 1, wherein the brake pressure is maintained until it is additionally detected that the clutch has been actuated by the driver.

9. Method according to claim 1, wherein the brake pressure is maintained until it is additionally detected that the driver has changed gear.

10. Method according to claim 9, wherein only gear changes which lead to a change in the direction of travel are taken into account.

11. Method according to claim 1, wherein the brake pressure is maintained until it is additionally detected that the accelerator pedal has been actuated by the driver.

12. Method according to claim 2 wherein the limiting value is determined as a function of the velocity of the vehicle.

13. Method according to claim 12, wherein, after the vehicle is started, an active build-up of brake pressure is deactivated until a switch is activated by the driver.

14. Method according to claim 2, wherein, after the vehicle is started, an active build-up of brake pressure is deactivated until a switch is activated by the driver.

15. Method according to claim 3, wherein, after the vehicle is started, an active build-up of brake pressure is deactivated until a switch is activated by the driver.

16. Method according to claim 4, wherein, after the vehicle is started, an active build-up of brake pressure is deactivated until a switch is activated by the driver.

17. Method according to claim 2, wherein the brake pressure is maintained until it is additionally detected that the accelerator pedal has been actuated by the driver.

18. Method according to claim 3, wherein the brake pressure is maintained until it is additionally detected that the accelerator pedal has been actuated by the driver.

19. Method according to claim 4, wherein the brake pressure is maintained until it is additionally detected that the accelerator pedal has been actuated by the driver.

20. Method according to claim 5, wherein the brake pressure is maintained until it is additionally detected that the accelerator pedal has been actuated by the driver.

* * * * *